Aug. 24, 1965

KIYOSHI INOUE 3,202,595

ELECTRO-CHEMICAL MACHINING PROCESS

Filed Aug. 23, 1960

Aug. 24, 1965
KIYOSHI INOUE
3,202,595
ELECTRO-CHEMICAL MACHINING PROCESS
Filed Aug. 23, 1960
2 Sheets-Sheet 2
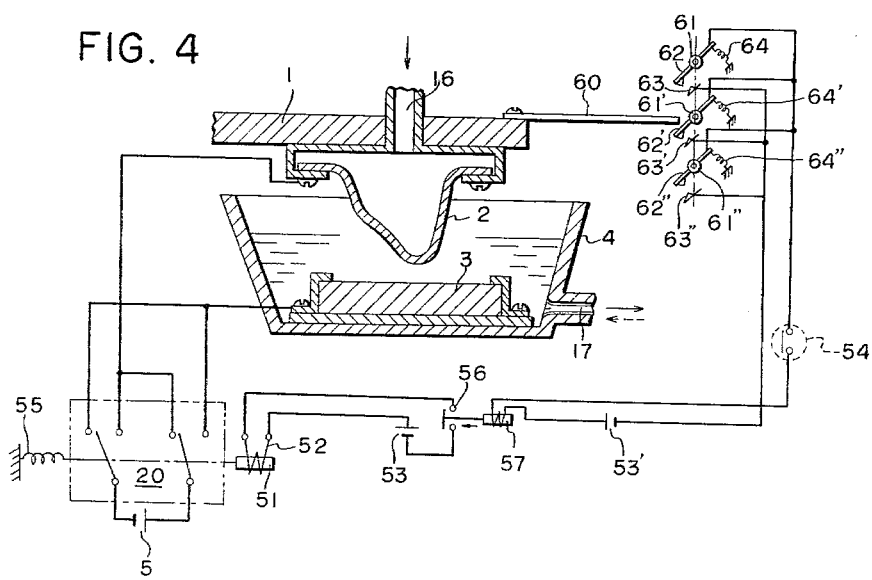
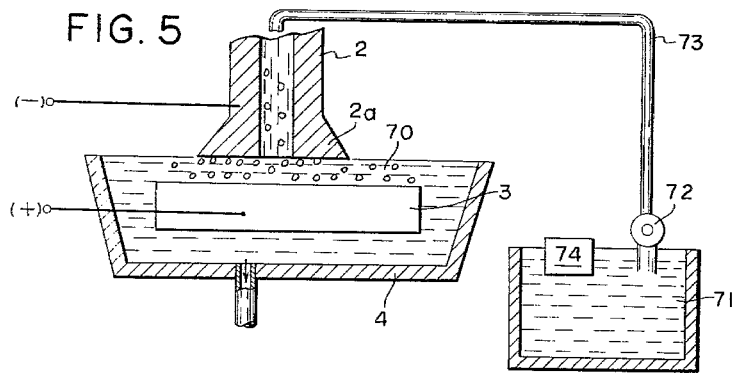
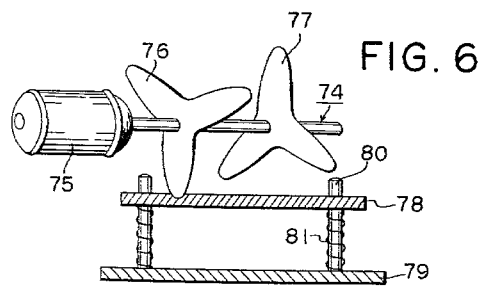

United States Patent Office 3,202,595
Patented Aug. 24, 1965

3,202,595
ELECTRO-CHEMICAL MACHINING PROCESS
Kiyoshi Inoue, 182 3-Chome, Tamagawa-Yogamachi,
Setagaya-ku, Tokyo, Japan
Filed Aug. 23, 1960, Ser. No. 51,448
11 Claims. (Cl. 204—143)

The present invention relates to a machining process of metal, in which a metal is chemically machined by electrolytic corrosion.

As a general rule, it is necessary that an electrolyte be uniformly ejected against a portion of a piece to be machined in the course of electro-chemical machining. By doing so, it is possible to effect an accurate and uniform machining. Moreover, an electrode used in this process must be selected so as to have a low resistance, because a relatively large electric current passes through an electrode in the course of electro-chemical machining.

In the conventional electro-chemical machining, said desired uniform ejection of electrolyte against a portion of a piece to be machined has usually been carried into effect, by ejecting an electrolyte through a plurality of perforations provided in a machining electrode.

However, it is very difficult to provide many perforations distributed uniformly over the surface of machining electrode, furthermore, an electrode which has many perforations lacks mechanical strength and has a very large electric resistance resulting from the number of perforations. Accordingly, in cases when the machining electrode requires a complicated form, an effective electrochemical machining cannot be obtained.

When a boring operation is desired to be effected by electro-chemical machining, a pipe-formed machining electrode may be effectively utilized in such a manner that an electrolyte is ejected from the interior of said electrode against a piece to be machined. But if any given formed cavity is desired to be formed on a piece to be machined, a machining electrode having the same form as said cavity is required to be used in such a manner that an electrolyte is ejected from the interior of said electrode through a plurality of perforations provided therein against the piece to be machined. However, it is very difficult to provide a great many perforations particularly in such a specially formed machining electrode so as to be uniformly distributed over the surface of said electrode.

It is an object of the present invention to overcome such technical difficulties in an electro-chemical machining process by simplest means and at the same time to improve the accuracy of machining.

Another object of the invention is to provide an electrochemical machining process wherein, without any prior perforation operation on a machining electrode as is stated above, a perforation operation is effected in one operation course during the total course of electro-chemical machining.

Further detailed object of the invention is to provide a perforation means wherein a machining electrode is constructed by two or more different metals having each distinct electrolysis voltage, and a polarity of applied electric voltage is reversed in the first or intermediate course of electro-chemical machining operation, and by this reversal of polarity said constituent metal of electrode having lower electrolysis voltage is corroded electrolytically so as to make said electrode porous.

Further detailed and particular objects of the invention is to provide an apparatus wherein a machining electrode is automatically controlled to be lowered so as to keep a constant machining distance against a piece to be machined, and said reversal of polarity of applied electric voltage is also automatically controlled to be effected at constant time interval by time relay or in accordance with a lowering displacement of electrode by predetermined distance.

Another particular object of the invention is to improve the accuracy of such a machining operation by utilizing as an operative solution an emulsion mixture consisting of electrolyte and insulating liquid instead of electrolyte only.

For a better understanding of the invention and the method of carrying the same into effect, reference will be made to the accompanying drawings in which:

FIG. 1 is an illustrative drawing of electro-chemical machining operation according to the present invention, wherein a machining electrode is first made porous in the course of said machining operation and then a desired electro-chemical machining is effected by utilizing said porous made electrode.

FIG. 2 is a detailed illustrative drawing of an apparatus of electro-chemical machining according to the present invention, wherein are provided a means for controlling a machining electrode to be lowered so as to keep a constant machining distance against a piece to be machined in the course of said machining operation and a means for making said electrode porous first and then effecting a desired electro-chemical machining by utilizing said porous made electrode.

FIG. 4 shows a means provided in the apparatus shown in FIG. 2 for controlling the reversal of polarity of applied electric voltage to be effected every time when a machining electrode has been lowered by predetermined distance in the course of electro-chemical machining.

FIG. 5 is an illustrative drawing of electro-chemical machining operation according to the present invention, wherein as an operative solution an emulsion mixture consisting of electrolyte and insulating liquid is used.

FIG. 6 shows a means provided in the apparatus shown in FIG. 5 for making said emulsion mixture.

As a rule, in the electro-chemical machining, D.C. voltage is applied between a machining electrode having the same surface form as that of the desired surface to be machined and the piece to be machined, under the ejection of electrolyte therebetween, the machining being carried into effect by electro discharge on the surface of said piece to be machined.

In the conventional electro-chemical machining, a machining electrode of required form is constructed by a single material and a plurality of perforations are provided on the total surface of said electrode.

According to the particular characteristics of the present invention, a machining electrode is constructed by a mixture of two or more different metals having each distinct electrolysis voltage.

By the terms "a mixture of metals having each distinct electrolysis voltage" as referred to in this specification are meant that in the course of electrolysis effected in electrolyte by using this mixture of metals as an electrode under constant applied voltage, one metal of this mixture is first electrolytically corroded at a certain voltage while another metal of this mixture is only corroded at a higher voltage.

This "mixture of metals" may be a simple mixture of metals, a sintered metals mixture or a coating of mixture of metals. The mixture of copper and zinc was used effectively as one example of the present invention.

A machining electrode of desired form can be constructed by a mixture of two or more metals having each distinct electrolysis voltage in the following manner:

Firstly, a basic pattern having same form as a desired form of machining electrode is prepared, and then a molten material of mixture of plural metals is sprayed over said pattern, whereby a plate formed electrode of thickness, for example, of 3-4 mm. can be constructed. Moreover, by sintering under pressure of mixed powders of plural metals into a desired form, or by alternate vacuum evaporation of plural metals on the surface of basic pattern, a plate formed electrode can be manufactured.

It is of advantage for breaking away of the manufactured electrode to apply silicone or the like as a break away material on the surface of basic pattern.

Figure 1:
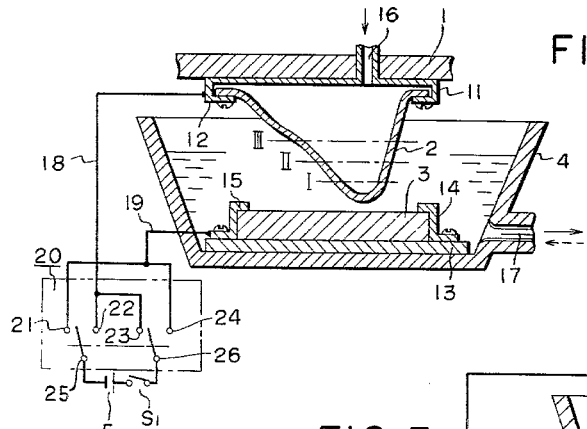

Referring to FIG. 1, a plate formed machining electrode 2 is fixed on a support of electrode 1 by clamping members 11 and 12. A piece to be machined 3 is fixed on a base plate 13 arranged in an electrolytic cell 4 by clamping members 14 and 15. An inlet opening for electrolyte 16 is provided on the support of electrode 1, through which an electrolyte is supplied into the electrode 2 in the course of electro-chemical machining. An outlet opening for electrolyte 17 is provided in the vicinity of bottom of the electrolytic cell 4, through which an electrolyte can be normally exhausted. However, in the course of electrolytical corrosion operation of electrode 2 to make said electrode porous, an electrolyte can be reverse-supplied through this opening 17. A lead wire 18 of electric supply for machining is connected at its one end to said clamping member 12 for electrode 2, and its other end is connected to fixed contacts 22 and 23 of a change-over switch 20. Another lead wire 19 of electric supply for machining is connected at its one end to said clamping member 15 for a piece to be machined 3, and its other end is connected to another of fixed contacts 21 and 24 of said change-over switch 20. The movable contacts 25 and 26 of said change-over switch 20 are connected respectively to both terminals of an electric source 5 for machining.

In the apparatus shown in FIG. 1, an electrolytical corrosion operation of the electrode 2 to make said electrode porous is effected in the following manner:

The movable contacts 25 and 26 of change-over switch 20 are caused to fall to the left, whereby positive terminal of said source 5 is connected to the electrode 2 and its negative terminal is connected to the piece to be machined, and then the electrolyte is reverse-supplied through outlet opening 17 into the electrolytic cell 4 about up to the level I shown by broken line. Under this condition, by switching in of a switch $S_1$ of said source 5, an electro discharge takes place between electrode 2 and piece 3 through the electrolyte and thereby an electro-chemical machining is effected. In the course of this electro-chemical machining, only a constituent metal of the electrode having lower electrolysis voltage is corroded electrolytically in the portion of said electrode which is just immersed in the electrolyte. Another constituent metal of the electrode having higher electrolysis voltage remains as it is and thereby said electrode 2 becomes porous in its original form.

Next, in the same apparatus, a machining operation of the piece to be machined 3 is effected in the following manner:

After the electrolyte has been exhausted from electrolytic cell 4, the movable contacts 25 and 26 of said change-over switch 20 is switched to the right, and the electrolyte is supplied under pressure through inlet opening 16 into the electrode 2, whereby said electrolyte is ejected through a great many perforations produced by above-mentioned porous-making operation of the electrode against the surface of the piece to be machined. Under this condition, an electro discharge takes place between electrode 2 and piece 3, and the piece 3 is connected to positive terminal of electric source 5 is machined electro-chemically. In the course of this machining operation, the machining electrode 2 continues to be lowered in accordance with progress of machining of the piece 3, whereby the piece 3 can be machined by degrees into the same form as that of the electrode 2.

As is clear from the above explanations, the once used electrolyte in the cell 4 for porous-making operation of the electrode is exhausted from said cell before subsequent chemical machining of the piece to be machined, and then said machining of the piece is effected with a fresh supply of electrolyte ejected under pressure from said porous electrode. Accordingly, the material once etched away from the electrode will never be plated back upon said electrode by a reversal of polarity of the electric source.

After the piece 3 has been machined to some extent, electrolyte supply through inlet opening 16 is stopped, and the electrolyte is reverse-supplied through outlet opening 17 into the cell 4 about up to the level II shown by broken line, and the switch 20 is switched to the left. By this operation, as is stated above, the machining electrode 2 connected to positive terminal of electric source 5 is machined so as to become porous just up to said level II. Then, after said electrolyte has been exhausted from the cell 4, a new supply of electrolyte is effected through inlet opening 16 into the electrode 2 and switch 20 is switched to the right, whereby, as is explained above, the piece 3 is electro-chemically machined by degrees into the same form as that of the electrode 2 about up to the level II. Similarly, after the machining electrode 2 has been machined to become porous up to the level III, the piece 3 can be machined up to the level III. Thus, the piece 3 can be electro-chemically machined by degrees into its final finished form just same as that of the machining electrode 2.

In above-stated explanation, in the course of porous-making operation of the electrode 2, the reverse-supply of electrolyte has been effected step by step to the levels I, II, III and so on. However, it was ascertained that after the electrode has been once made porous up to the level I, the porous-making operation of said electrode can be carried out effectively and continuously only by repeating the switching operation of switch 20 to the left, in condition of continued supply of electrolyte under pressure through inlet opening 16.

Figure 2:
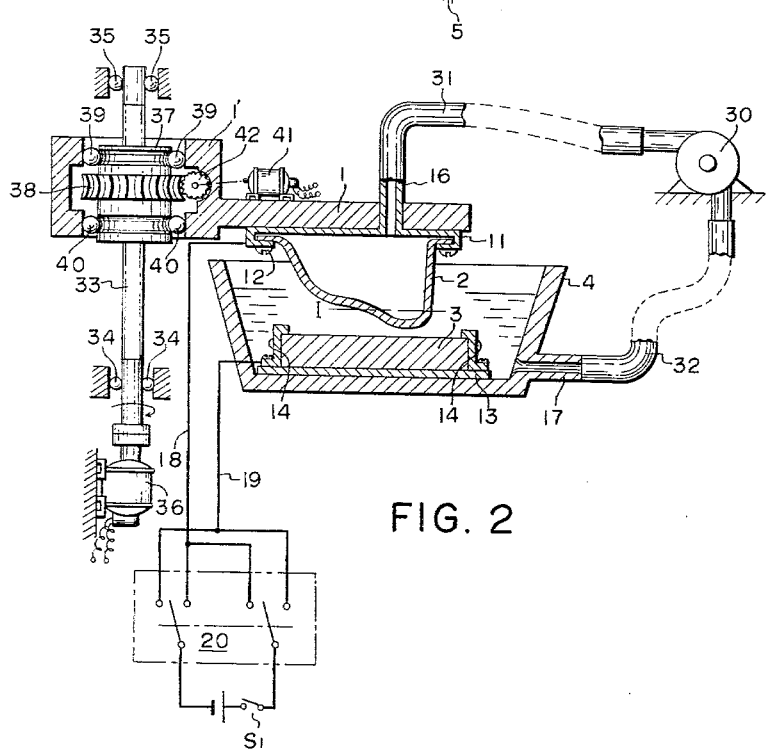

FIG. 2 shows more detailed arrangements for effecting an electro-chemical machining than FIG. 1.

Referring to FIG. 2, an electrolyte is caused to circulate, by a pump 30 by means of flexible pipes 31 and 32, through an inlet opening of electrolyte 16, a machining electrode 2, a piece to be machined 3 and an outlet opening of electrolyte 17 in series. In the course of machining, a support of electrode 1 is controlled by motors 36 and 41 to be displaced up and down for the purpose of lowering a machining electrode 2. This controlled displacement can be effected in the following manner:

A screw rod 33 rotatably supported by bearings 34 and 35 is caused to rotate always at a constant speed by means of clutching part of motor 36.

A nut 37 which is screwed on said screw rod 33 and is provided by a gear 38 on its periphery is supported rotatably by bearings 39 and 40 in a recess 1' projected from the support 1. Said gear 38 fixed on the periphery of nut 37 is geared with another gear 42 which is driven by motor 41 provided on said support 1. Accordingly, said nut 37 can be displaced up and down along said screw rod 33 only when a difference is produced between numbers of driving revolution by motor 36 and numbers of driving revolution by motor 41.

Thus, the support of machining electrode 1 is caused to be displaced up and down with said nut 37 along the screw rod 33 when a difference is produced between each numbers of revolution given to said nut 37 by each motor 36 and 41, and thereby the relative position of machining electrode 2 against piece to be machined 3 can be changed. As stated above, motor 36 is caused to rotate always at a constant speed, and accordingly, numbers of revolution of motor 41 is controlled so as to keep the distance between electrode 2 and piece 3 constant in accordance with the condition of electro discharge. This means that numbers of revolution of motor 41 are varied by controlling signals issued with respect to the values of machining current. In normal machining operation wherein the distance between machining electrode 2 and piece 3 is kept normal, the motor 41 continues to rotate in a constant relation with the motor 36 in their numbers of revolution and the numbers of revolution of motor 41 are adjusted to be increased or decreased according to signals issued with respect to current values for machining.

Accordingly, whenever the distance between electrode 2 and piece 3 becomes increased, for example, by progress of machining on piece 3 in normal machining operation, machining current is decreased and numbers of revolution of motor 41 is also decreased, and thereby the nut 37 is caused to descend along said screw rod 33 and the support of electrode 1 is also lowered therewith. Thus, by reducing the distance between electrode 2 and piece 3, a normal machining distance is maintained.

By effecting such a control method for machining distance, the piece 3 can be machined electro-chemically just into the same form as that of the machining electrode 2, and it will be well understood that adjustment response for machining distance is very sensitive because of adjustment by difference of numbers of revolution between both motors 36 and 41.

In the apparatus shown in FIG. 2, electro-chemical machining operation is carried out in the following manner:

After a porous-making operation of electrode 2 constructed by plural metals having each distinct electrolysis voltage has been carried out by reverse-supply of electrolyte up to the level I and switching of change-over switch 20 to the left, an electrolyte is supplied under pressure by pump 30 through inlet opening 16 into said porous-finished electrode so as to be ejected through perforations of electrode against the surface of piece 3 and said switch 20 is switched to the right. In this way, the electro-chemical machining for piece 3 is effected. In accordance with progress of machining on the piece 3, the numbers of revolution of motor 41 is varied, and thereby the machining electrode 2 is caused to be lowered towards piece 3 always keeping a normal machining distance between them. Thus, the piece 3 can be machined into the same form as that of said electrode 2. When machining for piece 3 by said porous portion of electrode 2 up to the level I has been thus completed, a second porous-making operation of said electrode 2 up to the level II is effected by switching of switch 20 to the left whereby said electrode is connected to positive terminal of electric source 5. After said second porous-making operation has been finished, by switching of switch 20 to the right, a second machining for piece 3 can be continued. As explained above referring to FIG. 1, by repeating similar operations the piece 3 is machined according to the form of machining electrode 2 and total machining operation is finished. Through the course of this operation, the electrolyte is always sprayed uniformly by pump 30 from inside through a great many perforations provided on a desired-formed porous portion of machining electrode 2 against only on a surface to be machined to piece 3. Accordingly, an accurate electrochemical machining can be expected.

Figure 3:
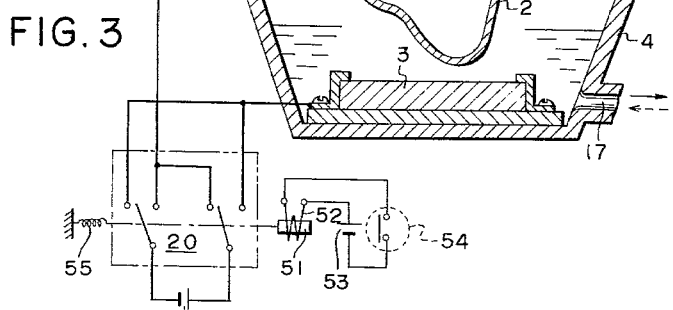
FIG. 3 shows a means provided in the apparatus shown in FIG. 2 for controlling the reversal of polarity of applied electric voltage to be effected at constant time interval.

FIG. 3 shows a means provided in the arrangement of FIG. 2 for controlling automatically the switching of a change-over switch 25 to be effected at constant time interval.

Referring to FIG. 3, a spring 55 to pull a movable contact of switch 24 to the left is provided on one side of a frame of said switch, and an iron core 51 with an exciting coil 52 thereon is also provided on another side of said frame. Said coil 52 is connected to its electric source 53 in series with a time relay 54. The contact of time relay 54 is closed normally, but after a predetermined time said contact is opened and after another predetermined time it is closed again. A similar opening and closing action of said time relay is repeated subsequently.

After first porous-making operation for electrode 2 has been finished, switching of change-over switch 20 to the right is caused against spring 55 by closing action of time relay 54, and machining for piece 3 is effected. In accordance with progress of machining on piece 3, the machining electrode 2 is caused to be lowered always keeping a normal machining distance therebetween.

By opening action of said time relay at the time predetermined with respect to said lowering time of electrode 2, switching of switch 20 to the left is caused by spring 55 and thereby second porous-making operation for electrode 2 is effected. At a predetermined time after this, closing of said relay 54 is again caused, and thereby second machining operation on piece 3 can be effected and so on until completion of desired machining operation.

In the arrangement shown in FIG. 3, thanks to automatic control of reversal of polarity of electric source 5, all machining operation is carried out fully-automatically.

FIG. 4 shows a controlling means provided in the arrangement of FIG. 2 to effect a porous-making operation for electrode 2 every time when said electrode has been lowered by predetermined distance in the course of electro-chemical machining. This controlling means only differs from said means of FIG. 3 in that a time relay 54 is exchanged by an auxiliary relay 57 in the same arrangement.

A normally closed contact 56 of said auxiliary relay 57 is connected in series with an exciting coil 52 and its electric source 53. At one end of the support is electrode 1 is fixed an operating rod 60, and a plurality of limit switch contacts 62–63, 62'–63', 62"–63" . . . normally kept open by springs 64, 64" . . . are arranged face to face with said rod 60. The movable contacts 62, 62', 62" . . . of said limit switches are pivoted respectively at 61, 61', 61" . . . with predetermined intervals therebetween, and every time when a free end of said rod 60 in its descending movement is brought into contact with one of said movable contacts 62, 62', 62" . . . said one contact of limit switch is closed. Each contact of limit switch is connected in parallel and said each parallel connection is connected respectively in series with a time relay 54, an electric source 53' and an exciting coil of said auxiliary relay 57. The time relay 54 is normally closed, and at a predetermined time after one of said contacts 62–63, 62'–63', 62"–63" has been closed, said relay 54 opens its contact, and immediately after said one contact has been opened, said relay 54 closes its contact.

When first porous-making operation of machining electrode 2 has been finished, the auxiliary relay 57 closes its contact 56 and thereby the change-over switch 20 is switched against spring 55 to the right and machining operation for piece 3 is started. According to progress of machining of piece 3, the support of electrode 1 together with operating rod 60 continues to descend, and by free end of said rod 60 the limit contact 62–63 is caused to be closed against spring 64. As a result of this, said auxiliary relay 57 is excited by closed circuit of electric source 53', auxiliary relay 57, limit contact 62–63 and time relay 54 in series and thereby the contact 56 is opened as shown by arrow. By this opening of contact 56, the change-over switch 20 is switched to the left by spring 55 and second porous-making operation of machining electrode 2 is effected. At a predetermined time after this operation has been effected, time relay 54 is opened and auxiliary relay 57 closes its contact 56 whereby change-over switch 20 is again switched to the right. Thus, support of electrode 1 again begins to descend, and free end of rod 60 is disconnected from said limit contact 62–63 and after a time said free end of rod 60 is brought again into contact with limit contact 62'–63'.

As soon as limit contact 62–63 has been opened, time relay 54 is closed for the next operation. Accordingly, by closing of contact 62'–63', the abovementioned actions are repeated and next porous-making operation of machining electrode is re-opened. Thus, a piece to be machined 3 and machining electrode 2 are alternately machined electro-chemically in sequence, and finally said piece 3 is finish-machined into the same form as that of machining electrode.

If desired, it is easy to provide an additional limit switch at the last stage of abovementioned limit switches for reporting the end of machining operation, in order to cut off machining electric source 5, operating electric sources 53, 53' and all other electric sources for motors 36, 41 and pump 30.

In such a machining operation as described above, it is possible to improve the accuracy of machining by utilizing as an operative solution an emulsion mixture consisting of electrolyte and insulating liquid instead of electrolyte only.

Referring to FIG. 5, a pipe-formed electrode, for example, is utilized as a machining electrode 2, and if desired, the bottom of said electrode 2 is enlarged as shown by 2a in FIG. 5 for assuring the accuracy of machining. This electrode 2 and a piece to be machined 3 are immersed in operative solution 70 in a machining cell 4.

This solution 70, if desired, is supplied by a pump 72 through pipe 73 from a reservoir 71 into said cell 4 or through a hole penetrating said electrode 2 against a machining part of piece 3.

In said reservoir 71, both electrolyte and insulating liquid are contained and by a high frequency oscillation generator 74 these liquids are mixed into an emulsion state. Often, a surface to be machined of piece 3 is not made smooth and presents an uneven surface. In such a case, a clearance between electrode 2 and piece 3 is so adjusted that the distance between electrode 2 and top portions of said uneven surface of piece 3 is equal to or less than the diameter of a particle of electrolyte in said emulsion mixture. Consequently, a space between electrode 2 and bottom portions of said uneven surface of piece 3 is filled by said emulsion mixture of electrolyte particles and insulating liquid particles, while a space between electrode 2 and top portions of said uneven surface of piece 3 is short-circuited by electrolyte particles. Accordingly, by electric voltage applied between electrode 2 and piece 3, electric current flows only between electrode 2 and top portions of said uneven surface of piece 3 through particle of electrolyte, and thereby these top portions only are corroded and machined by electrolysis. On the contrary, a space between electrode 2 and bottom portions of said uneven surface of piece 3 cannot be machined because of large insulating resistance therebetween. Thus an uneven surface of piece to be machined can be machined gradually into a flat surface. In this case, it will be easily understood that the assuracy of machining is defined by diameter of particle of electrolyte in emulsion mixture.

It is reported by experiment that when emulsion mixture of transformer oil and NaCl solution was used, the accuracy of machining was 5/100 mm. for diameter of 20μ of particle of NaCl solution.

To make such an emulsion, an apparatus shown in FIG. 6 may be utilized, wherein a mixture of electrolyte and insulating liquid can be oscillated by high frequency oscillator. A generating mechanism of oscillation is by no means limited to such a one as shown in FIG. 6. Oscillation may be generated, for example, by alternating suction power which is produced by a moving iron piece arranged in face of electromagnet excited by A.C. current. Referring to FIG. 6, a plurality of cams 76, 77 are driven by motor 75, and by quick rotations of said cams an oscillating plate 78 which is always pushed up by springs 81 slidably along guide rods 80 on a base plate 79 is caused to oscillate up and down. Such a mechanism 74 is arranged in said reservoir 71 (FIG. 5) and by quick oscillations of plate 78 an emulsion state of mixed liquids is produced. In this case, numbers of oscillation are defined and adjusted in any way by numbers of cams and their numbers of revolution.

As mentioned above, according to the present invention, a machining electrode is constructed by two or more different metals having each distinct electrolysis voltage, and by electrolytic corrosion of a constituent metal of said electrode having lower electrolysis voltage only, a provision of many perforations uniformly distributed on the surface of electrode, which has been hitherto deemed difficult to attain, is successfully effected, and thereby any desired complicated form of a piece to be machined can be machined electro-chemically. Moreover, according to the construction method of electrode by the present invention, perforations for machining can be provided uniformly on any desired portion only of electrode, and thereby a continuous machining for piece to be machined can be effected with such an accuracy as hitherto never experienced. In the conventional electro-chemical machining wherein a plurality of perforations is provided uniformly over total surface of machining electrode prior to machining procedure itself, electroylte for machining is ejected uniformly from said all perforations distributed over total surface of electrode, and consequently undesired surface portion of the piece to be machined can also be electro-chemically machined. This has been a serious defect in conventional electro-chemical machining especially in the case when a finish machining of complicated form is desired. On the contrary, in the process of present invention, the machining electrode can be perforated uniformly at any necessary portion only whenever it is desired, and by ejection of electrolyte through perforations provided only at such portion, a machining for piece to be machined can be effected limitedly on such portion only, without any harmful ejection of electrolyte against the surface of undesired portion of said piece, and thereby, a machining of complicated form can be effected with special accuracy. Moreover, by the present invention, a machining electrode is made porous and thereby its electric resistance can be made relatively small and its resistance loss is also relatively small even if large current circulates for machining. Besides, according to the invention, it is possible to make a machining surface more smooth and to improve the accuracy of machining by utilizing an emulsion mixture of electrolyte and insulating liquid as an operative solution.

The substance of the present invention is by no means limited to the embodiments as referred to above, and is to be fully considered in the scope of claims described hereunder.

What I claim is:

1. An electro-chemical machining process comprising successively forming apertures in different portions of a hollow pre-formed electrode constituted by two materials having different electrolysis voltages by successively exposing said differing portions of said electrode to an electrolyte in which a workpiece is positioned while coupling said electrode and workpiece to an electrical source to electrolytically corrode the material of the respective portion of the electrode having the lower electrolysis voltage, and progressively machining the workpiece between each successive forming of the apertures in the electrode by first removing the electrolyte, then reversing the direction of current flow from the electrical source to the electrode and workpiece and then discharging the electrolyte from within the hollow electrode against the workpiece.

2. A process as claimed in claim 1 wherein said successive forming of apertures in the electrode and progressive machining of the workpiece is effected at predetermined intervals in time-wise sequence.

3. A process as claimed in claim 1 wherein the removal and discharging of the electrolyte is controlled by reversing the direction of the current flow from the electrical source to the workpiece and electrode so that the entire process can be effected solely by successive reversal of the current flow.

4. A process as claimed in claim 1 wherein said electrode is lowered to maintain a predetermined distance between said electrode and workpiece subseqeunt to each machining operation of the workpiece.

5. A process as claimed in claim 4 wherein said machining operation is terminated as said electrode assumes a lowered position corresponding to the predetermined distance, and said aperture forming operation is begun.

6. An electro-chemical machining process comprising operatively positioning a pre-formed hollow electrode constituted by two metals having different electrolysis voltages and a workpiece in an electrolyte within an electrolytic cell, connecting said electrode and workpiece to an electrical source to provide electrolytic action to electrolytically corrode the metal of the electrode having the lower electrolysis voltage whereby a perforated electrode is produced, exhausting the electrolyte from the cell and electrochemically machining the workpiece by reversing the polarity of said electric source and continuously ejecting electrolyte from within said perforated hollow electrode against the workpiece.

7. A process as claimed in claim 6, wherein said hollow electrode is pre-formed by flame spraying a mixture of said two metal materials as a layer on a pattern having the desired shape of the electrode, allowing said layer to harden on said pattern and removing the hardened layer from said pattern.

8. A process as claimed in claim 6 wherein only a portion of said hollow electrode is initially positioned in said electrolyte whereby only said portion is perforated.

9. A process as claimed in claim 8 comprising adding an increased quantity of electrolyte in said cell subsequent to machining of said workpiece wherein the level of electrolyte is raised to engulf an increased portion of said hollow electrode, said current flow from said source being again reversed to effect perforation of said electrode to the new level of electrolyte, exhausting the electrolyte once again from said cell and additionally machining the workpiece under the action of electrolyte which is again discharged through the electrode against the workpiece with the current source being again reversed to provide said electrode as the cathode.

10. A machining process comprising supporting in a vessel in facing relation above a workpiece a hollow electrode which is of pre-formed shape corresponding to a desired machining cavity which is to be formed in the workpiece, said electrode being constituted of two materials having differing electrolysis voltages, successively introducing increasing quantities of an electrolytic solution into said vessel to engulf said workpiece and increasing portions of said hollow electrode, emptying the vessel after each introduction of solution, connecting said workpiece and said electrode to a voltage source when said vessel contains solution to electrolytically corrode said hollow electrode to form perforations therein to a level corresponding to that of the solution in the vessel, introducing into said hollow electrode after each emptying of the electrolytic solution from said vessel a fresh electrolytic solution while reversing the polarity of said workpiece and electrode to cause the fresh solution to flow through the perforations formed in the hollow electrode and thereby impinge upon the workpiece to electrolytically corrode the same in the form of said hollow electrode.

11. A machining process for machining in a workpiece a cavity of predetermined shape, said process comprising supporting in a vessel in facing relation with the workpiece a hollow electrode of pre-formed shape corresponding to that of the desired cavity, successively electrolytically corroding said electrode to form perforations therein in successively increasing areal portions located increasing distances from said workpiece, introducing electrolyte into the thusly perforated hollow electrode subsequent to each electrolytic corroding thereof while connecting said electrode and workpiece to opposite poles of a D.C. source to discharge electrolytic solution against said workpiece and thereby electrolytically machine said workpiece, and moving the workpiece and electrode relative to one another to maintain a substantially constant spacing between the electrode and the surface of the workpiece in the electrolytically machined zone to progressively machine in said workpiece said cavity in the form of said electrode.

References Cited by the Examiner

UNITED STATES PATENTS

| 1,243,111 | 10/17 | Sanders | 136—86 |
|---|---|---|---|
| 2,385,198 | 9/45 | Engle | 204—143 |
| 2,433,687 | 12/47 | Durst | 204—143 |
| 2,558,504 | 6/51 | Aller | 204—143 |
| 2,800,566 | 7/57 | Matulaitis | 219—69 |
| 2,920,026 | 1/60 | Kistler | 204—143 |
| 2,924,701 | 2/60 | Stamper | 219—69 |
| 2,939,825 | 6/60 | Faust | 204—143 |
| 3,058,895 | 10/62 | Williams | 204—224 |

FOREIGN PATENTS

| 270,763 | 7/28 | Great Britain. |
|---|---|---|
| 335,003 | 9/30 | Great Britain. |
| 592,130 | 2/34 | Germany. |
| 743,258 | 12/43 | Germany. |
| 1,241,349 | 8/60 | France. |

JOHN H. MACK, *Primary Examiner.*

JOHN R. SPECK, ALLEN B. CURTIS, *Examiners.*